US012686111B2

(12) United States Patent
Wu et al.

(10) Patent No.: US 12,686,111 B2
(45) Date of Patent: Jul. 21, 2026

(54) COMPLIANT MECHANISM FOR IMPROVING REACTION TORQUE SENSING IN ROBOTIC ACTUATORS

(71) Applicant: Bioness Medical, Inc., Valencia, CA (US)

(72) Inventors: William Wu, Austin, TX (US); Rohit John Varghese, Austin, TX (US); Youngmok Yun, Austin, TX (US)

(73) Assignee: Bioness Medical, Inc., Valencia, CA (US)

( * ) Notice: Subject to any disclaimer, the term of this patent is extended or adjusted under 35 U.S.C. 154(b) by 892 days.

(21) Appl. No.: 18/075,515

(22) Filed: Dec. 6, 2022

(65) Prior Publication Data

US 2023/0173659 A1 Jun. 8, 2023

Related U.S. Application Data

(60) Provisional application No. 63/286,329, filed on Dec. 6, 2021.

(51) Int. Cl.
| | |
|---|---|
| *B25J 9/00* | (2006.01) |
| *A61H 3/00* | (2006.01) |
| *B25J 13/08* | (2006.01) |

(52) U.S. Cl.
CPC .............. *B25J 9/0006* (2013.01); *A61H 3/00* (2013.01); *B25J 13/085* (2013.01)

(58) Field of Classification Search
CPC .... B25J 13/085; B25J 9/0006; B25J 17/0208; A61H 2201/5058; A61H 2201/1659;
(Continued)

(56) References Cited

U.S. PATENT DOCUMENTS

| | | | |
|---|---|---|---|
| 3,088,333 | A | 5/1963 | Walton |
| 3,214,999 | A | 11/1965 | Lapp |
| (Continued) | | | |

FOREIGN PATENT DOCUMENTS

| | | |
|---|---|---|
| CA | 2741362 A1 | 4/2010 |
| CN | 108972534 A | 12/2018 |
| (Continued) | | |

OTHER PUBLICATIONS

Torque Transmission, "What is a Speed Reducer? How does a Speed Reducer work?," https://www.torquetrans.com/blog/how-a-speed-reducer-works, 2020, 6 pages.
(Continued)

*Primary Examiner* — Brandy S Lee
*Assistant Examiner* — Sara K Toich
(74) *Attorney, Agent, or Firm* — Trop, Pruner & Hu, P.C.

(57) ABSTRACT

A robotic system has a bracket that helps integrate a load sensor into a robotic actuator such that the sensor is not overly affected by loads not aligned with its load sensing axis (which can lead to inaccurate measurements of the desired load). The bracket includes: (a) a tube having an exterior wall and a hollow interior, (b) a first beam between first and second voids, a second beam between a third void and the second void, a third beam between the first void and a fourth void, a fourth beam between the third and fourth voids. The bracket further includes: (a) additional first, second, third, and fourth voids; (c) an additional first beam between the additional first and second voids, an additional second beam between the additional third and second voids, an additional third beam between the additional first and fourth voids, and an additional fourth beam between the additional third and fourth voids.

25 Claims, 14 Drawing Sheets

103

(58) Field of Classification Search

CPC .......... A61H 3/00; A61H 1/0237–0288; A61H 2001/0248–027; F16D 3/28; F16D 2300/18

USPC ........................................................ 901/45

See application file for complete search history.

(56) References Cited

U.S. PATENT DOCUMENTS

| | | | | |
|---|---|---|---|---|
| 3,527,062 | A | * | 9/1970 | Bilinski ................. G01C 19/22 |
| | | | | 464/78 |
| 3,613,457 | A | * | 10/1971 | Paine ........................ F16D 3/28 |
| | | | | 74/5.6 R |
| 3,985,025 | A | | 10/1976 | Ormond |
| 4,547,119 | A | | 10/1985 | Chance et al. |
| 5,155,423 | A | | 10/1992 | Karlen et al. |
| 5,327,790 | A | | 7/1994 | Levin et al. |
| 5,644,951 | A | | 7/1997 | Hatamura |
| 6,492,807 | B2 | | 12/2002 | Spellman |
| 6,676,561 | B2 | | 1/2004 | Fritzer et al. |
| 7,140,994 | B2 | | 11/2006 | Mundis |
| 7,979,160 | B2 | | 7/2011 | Teaford et al. |
| 8,683,876 | B2 | | 4/2014 | Fujii et al. |
| 8,729,769 | B2 | | 5/2014 | Takeuchi |
| 9,355,663 | B1 | | 5/2016 | Harper et al. |
| 9,895,087 | B2 | | 2/2018 | Lee et al. |
| 9,966,816 | B2 | | 5/2018 | Kokubo et al. |
| 10,052,761 | B2 | * | 8/2018 | Langenfeld .............. B25J 9/161 |
| 10,143,570 | B2 | | 12/2018 | Herr et al. |
| 10,335,959 | B2 | | 7/2019 | Ogata |
| 10,463,560 | B2 | | 11/2019 | Deshpande et al. |
| 10,732,060 | B2 | | 8/2020 | Strauss |
| 10,903,725 | B2 | | 1/2021 | Covington et al. |
| 11,147,731 | B2 | | 10/2021 | Varghese et al. |
| 2011/0239788 | A1 | * | 10/2011 | Nagasaka .............. B25J 13/085 |
| | | | | 901/19 |
| 2011/0314950 | A1 | | 12/2011 | Mamba |
| 2016/0201783 | A1 | | 7/2016 | Miyake et al. |
| 2016/0296345 | A1 | | 10/2016 | Deshpande et al. |
| 2017/0184190 | A1 | | 6/2017 | Klassen |
| 2017/0321790 | A1 | | 11/2017 | Klassen et al. |
| 2018/0104825 | A1 | * | 4/2018 | Vulcano ................... G01L 5/226 |
| 2018/0116828 | A1 | * | 5/2018 | Quinn .................... B25J 9/0006 |
| 2018/0274646 | A1 | | 9/2018 | Sato et al. |
| 2019/0160658 | A1 | | 5/2019 | Hutter et al. |
| 2019/0176320 | A1 | | 6/2019 | Smith et al. |
| 2019/0222103 | A1 | | 7/2019 | Nedrehagen et al. |
| 2020/0230804 | A1 | | 7/2020 | Griffith et al. |
| 2020/0281796 | A1 | | 9/2020 | Lakany et al. |
| 2020/0352811 | A1 | | 11/2020 | Varghese et al. |
| 2022/0031550 | A1 | | 2/2022 | Varghese et al. |

FOREIGN PATENT DOCUMENTS

| | | | |
|---|---|---|---|
| EP | 2404713 | A1 | 1/2012 |
| EP | 3067164 | A2 | 9/2016 |
| KR | 20130037084 | A | 1/2013 |
| WO | 2007136803 | A2 | 11/2007 |
| WO | 2018064709 | A1 | 4/2018 |
| WO | 2019002906 | A1 | 1/2019 |

OTHER PUBLICATIONS

Metromatics, "Reaction Torque Sensor," https://metromatics.com.au/product/reaction-torque-sensor/, 2020, 6 pages.

Realpars, "Difference Between Absolute and Incremental Encoders?," https://realpars.com/absolute-vs-incremental-encoder/, 2020, 23 pages.

Motion Control Tips, Danielle Collins, "FAQ: How do magnetic encoders work?," https://www.motioncontroltips.com/faq-how-do-magnetic-encoders-work/, Nov. 13, 2015, 9 pages.

Honeywell, "Model QWLC-8M, Miniature Reaction Torque Transducer," https://measurementsensors.honeywell.com/ProductDocuments/Torque/Model_QWLC-8M_Datasheet.pdf, Jun. 2008, 4 pages.

Honeywell, "Honeywell Sensing and Control, Sensors for Test and Measurement," https://measurementsensors.honeywell.com/Pages/Product.aspx?pid=QWLC-8M, Date Unknown, 2 pages.

Honeywell, "Honeywell Sensing and Control, Sensors for Test and Measurement, Ways to Measure the Force Acting on a Rotating Shaft," https://measurementsensors.honeywell.com/techresources/appnotes/Pages/Ways_to_Measure_the_Force_Acting_on_a_Rotating_Shaft.aspx, Copyright 2004-2020, 3 pages.

Wikipedia, "Belleville washer," https://en.wikipedia.org/wiki/Belleville_washer, last edited on Jan. 6, 2020, 6 pages.

Wikipedia, "Harmonic drive," https://en.wikipedia.org/wiki/Harmonic_drive, last edited on Feb. 9, 2019, 4 pages.

Wiki How, "How to Determine Gear Ratio," https://www.wikihow.com/Determine-Gear-Ratio, Oct. 16, 2019, 5 pages.

Wikipedia, "Strain wave gearing," https://en.wikipedia.org/wiki/Strain_wave_gearing, last edited on Dec. 10, 2019, 2 pages.

Harmonic Drive, "Speed Reducers for Precision Motion Control," 2018, 56 pages total.

Wikipedia, "Cycloidal drive," https://en.wikipedia.org/wiki/Cycloidal_drive, last edited on Feb. 10, 2020, 3 pages.

ATO, "Planetary Speed Reducer Working Principle and Applications," Jan. 2, 2020, 5 pages.

International Searching Authority, "Notification of Transmittal of the International Search Report and the Written Opinion of the International Searching Authority," mailed Jun. 23, 2020, in International application No. PCT/US2020/019032.

Wikipedia, "Bearing (mechanical)", retrieved from https://en.wikipedia.org/wiki/Bearing_(mechanical) on Aug. 31, 2021.

Handbook of Compliant Mechanims, "Elements of Mechanisms", First Edition, Chapter 11, pp. 155-185, 2013.

Wikipedia, "Compliant mechanism", retrieved from https://en.wikipedia.org/wiki/Compliant_mechanism on Aug. 31, 2021.

Handbook of Compliant Mechanims, Howell, "Introduction to Compliant Mechanisms", First Edition, Chapter 1, 2013.

Wikipedia, "Rectilinear polygon", retrieved from https://en.wikipedia.org/wiki/Rectilinear_polygon on Aug. 31, 2021.

Torque Measurement, "How to measure torque?", retrieved from https://www.futek.com/torque-measurement on Jul. 6, 2021.

Unites States Patent Office, Final Office Action dated Jul. 5, 2024 in U.S. Appl. No. 18/067,141 (16 pages).

International Searching Authority, International Search Report and Written Opinion dated Jan. 10, 2023 in International Application No. PCT/US2022/043930 (11 pages).

Unites States Patent Office, Non-Final Office Action dated Dec. 22, 2023 in U.S. Appl. No. 18/067,141 (26 pages).

* cited by examiner

180

SECTION A-A

SECTION A-A

SECTION B-B

103'

SECTION c-c

103'

C

C

COMPLIANT MECHANISM FOR IMPROVING REACTION TORQUE SENSING IN ROBOTIC ACTUATORS

CROSS-REFERENCE TO RELATED APPLICATION

This application claims priority to U.S. Provisional Patent Application No. 63/286,329 filed on Dec. 6, 2021 and entitled "Compliant Mechanism for Improving Reaction Torque Sensing in Robotic Actuators", the content of which is hereby incorporated by reference.

TECHNICAL FIELD

Embodiments of the invention are in the field of compliant mechanisms in robotic actuators.

BACKGROUND

As addressed in U.S. Pat. No. 10,463,560, exoskeletons are mechatronic systems worn by a person in such a way that a direct transfer of mechanical power from the exoskeleton occurs. These robotic mechanisms have been applied in a variety of settings such as, for example, telemanipulation, man-amplification, rehabilitation, and to assist impaired human motor control. However, many of these applications of exoskeleton devices have yet to find widespread use, acceptance, or practicality.

One example area in which these devices have been proposed is the treatment of stroke. Stroke affects thousands of Americans every year and the recovery process is long, difficult, and costly. The use of a robotic exoskeleton may potentially reduce the length, difficulty, and cost of this recovery process. Various efforts have been proposed to provide a robotic exoskeleton for the upper-body.

Such exoskeletons and mechatronic systems may include actuators. Load sensors may be used to detect forces being exerted by robotic actuators. For example, an upper body exoskeleton may use one or more sensors to evaluate the amount of force exerted by a linkage (e.g., a robotic forearm) on a joint (e.g., an elbow). Typical robotic actuators only consider the position of the actuator and can thus inadvertently exert large forces on an object when the actuator moves. Torque sensing actuators (or sensing actuators in general) allow the actuator to consider the force of the interaction (e.g., between an actuator and an object) in addition to the position (e.g., of the actuator) and thus help prevent accidents when the actuator moves. In addition, the force sensor can provide feedback to the operator and allow for additional data to be collected.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIGS. 3A, 3B, 3C, 3D, 3E illustrate various degrees of freedom for an embodiment of the bracket.

DETAILED DESCRIPTION

Figure 1A:
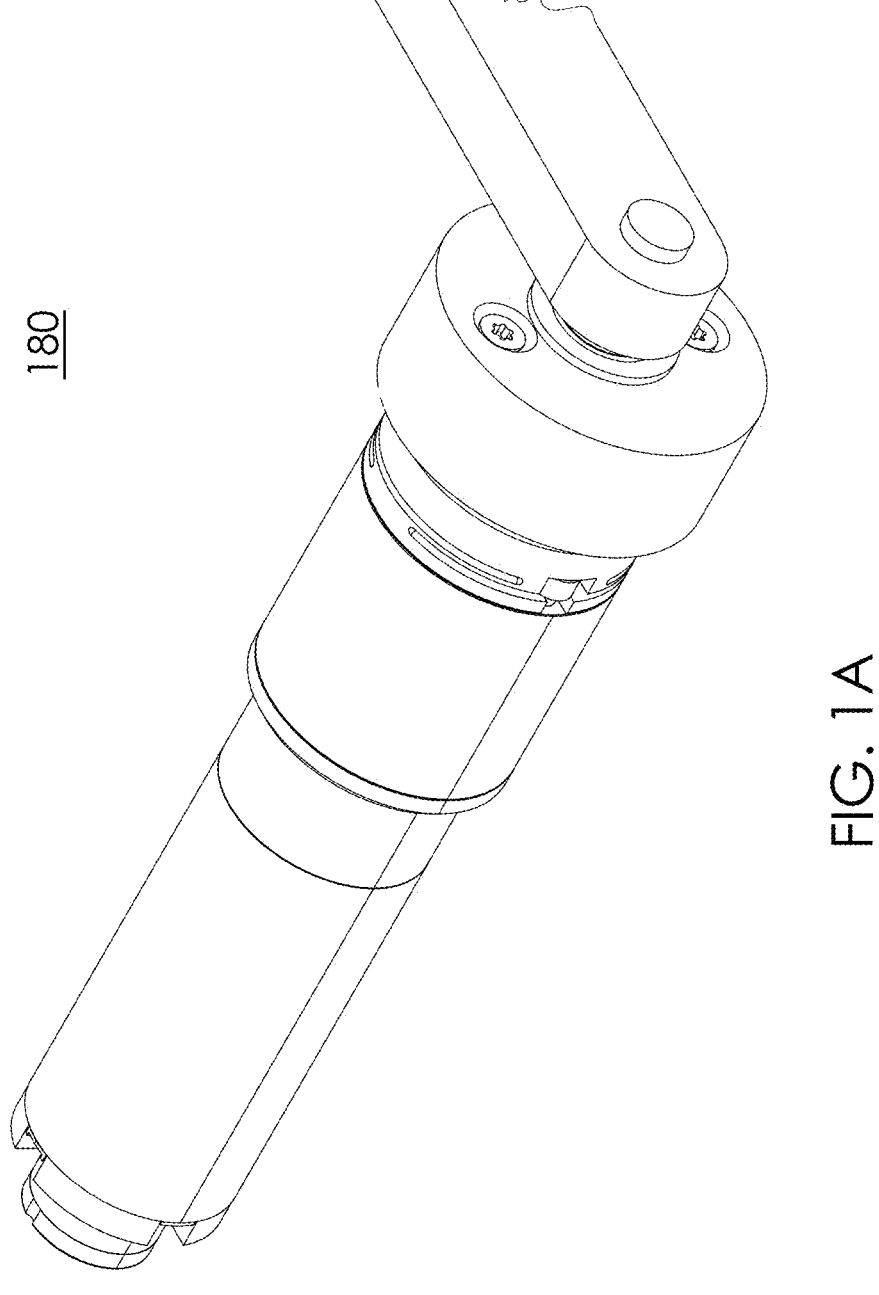
FIG. 1A provides a perspective view of a joint in an embodiment.
Figures 1B, 1C:
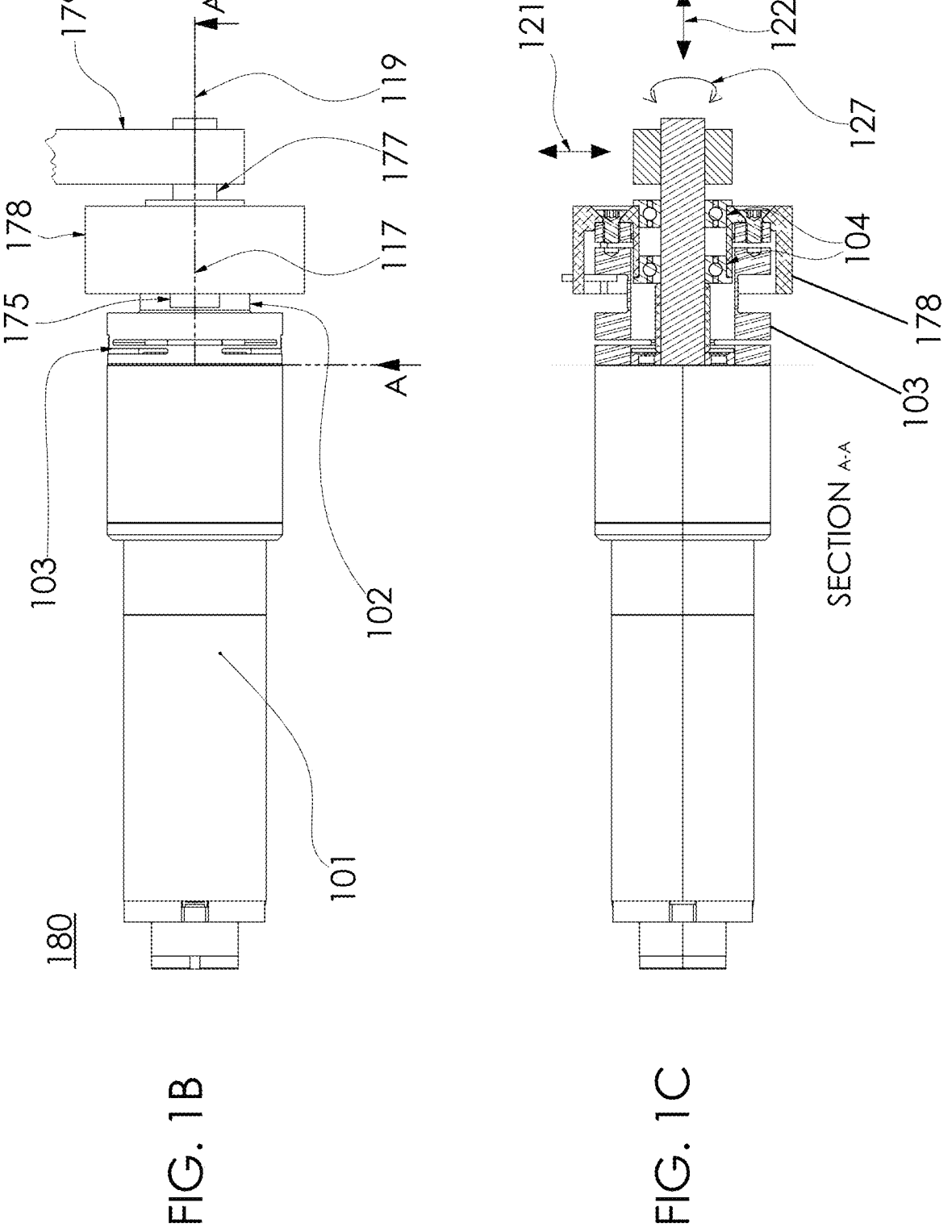
FIG. 1B provides a side view of the joint.
FIG. 1C provides a partial cross-sectional view of the joint.
Figure 1D:
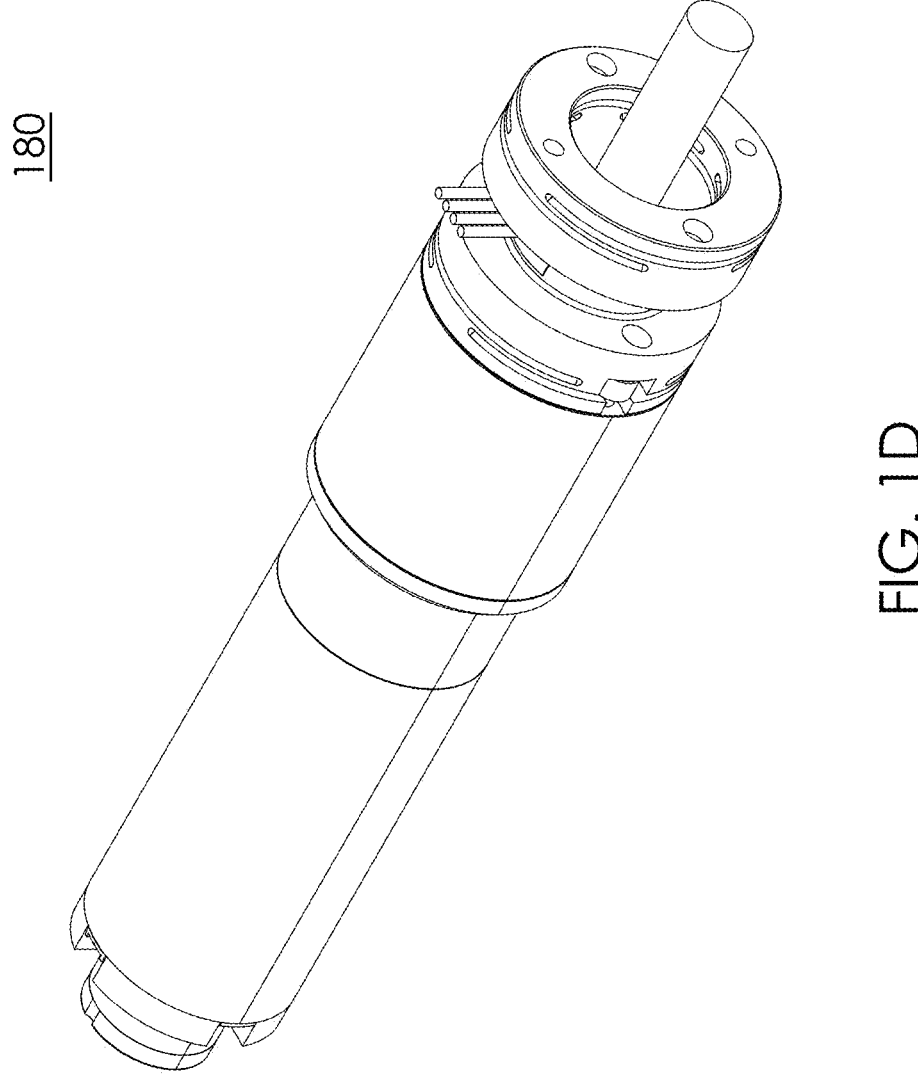
FIG. 1D provides a perspective view of a portion of the joint in an embodiment.
Figure 1F:
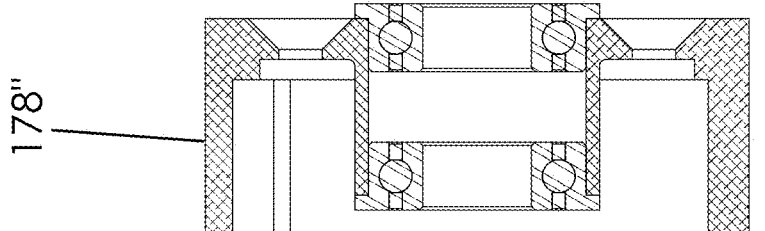
FIG. 1F provides a cross-sectional view of a housing (178") in an embodiment.
Figure 1E:
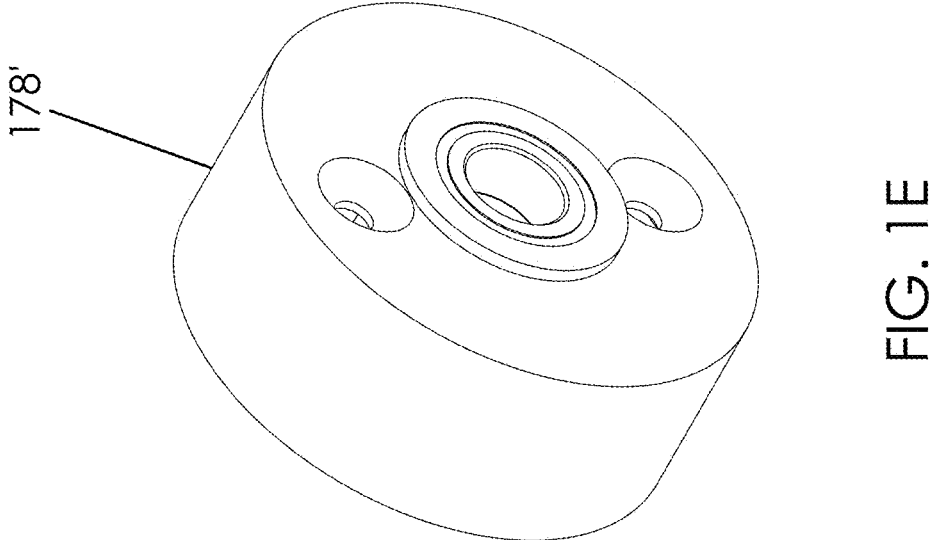
FIG. 1E provides a perspective view of a housing (178') in an embodiment.
Figure 2A:
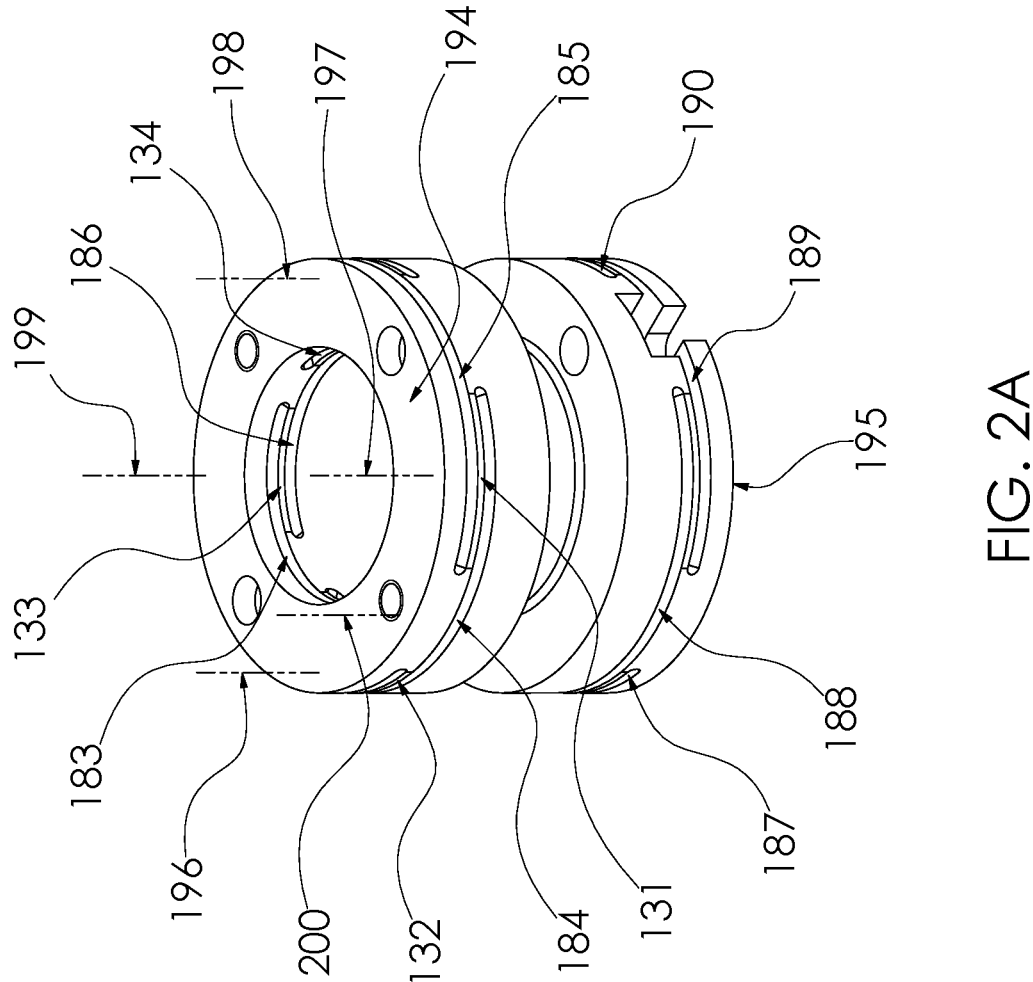
FIGS. 2A, 2B respectively illustrate perspective and side views of a bracket in an embodiment.
Figure 2B:
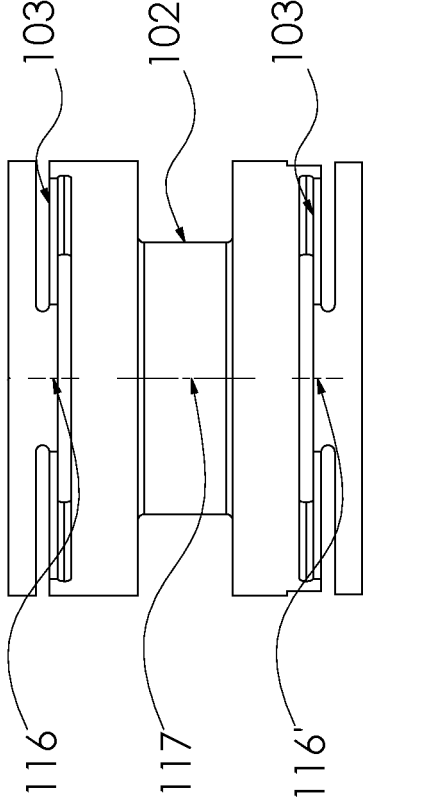

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments (e.g., walls may not be exactly orthogonal to one another in actual fabricated devices). Moreover, the drawings may only show the structures useful to understand the illustrated embodiments. Additional structures known in the art may not have been included to maintain the clarity of the drawings. For example, not every layer of a device is necessarily shown. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Phrases such as "comprising at least one of A or B" include situations with A, B, or A and B.

Applicant determined integrating a load sensor into a robotic actuator such that it is not affected by loads not aligned with its load sensing axis (which can lead to inaccurate measurements of the desired load) is a difficult task when designing robotic force sensing actuator systems. Applicant determined many conventional designs do not attempt to isolate load sensors and accept that there will be greater load sensing inaccuracy due to, for example, loads not aligned with the desired axis to be measured. For instance, robotic actuators are frequently mounted directly to reaction torque load cells, and the reaction torque load cells are fixed to the overall robotic structure. This arrangement passes all forces and moments (aligned as well as un-aligned to desired axis or axes to be sensed) to the robotic actuator through the reaction torque load sensor. As another example, in many applications that use strain gages to sense loads, a Wheatstone bridge arrangement of the strain gage elements theoretically eliminates the effect of nonaligned loads on the sensing output. However, due to imperfections in manufacturing of these sensors, error is not completely eliminated when these loads are applied to the sensor output.

Applicant determined that other designs may attempt to isolate loads on the load sensing element by supporting the system with a support system which: (a) restricts the movement of the actuator in directions not aligned with the output movement direction of the robotic actuator, and (b) supports any loads which act in directions not aligned with the output force or moment of the actuator. Such attempts are an improvement over some conventional systems but are still imperfect. For instance, Applicant determined in such designs the support system of the actuator did not perfectly support all non-aligned forces on the actuator. As a result, some non-aligned forces were still acting on the load sensor causing unacceptable amounts of error. Also, the support itself was imperfect and introduced additional non-aligned forces which acted on the load sensor and thereby introduced error.

However, embodiments described herein are improvements over the above-mentioned systems because, in addition to the support system which mostly eliminates any loads not aligned to the output force of the actuator but which can introduce its own error, a compliant element prevents nearly all misaligned loads thereby reducing the effect of any imperfections which may exist in the support system on the load sensor.

An embodiment addresses the undesirable sensing of forces that may be the result of securing the sensor to the system (e.g., a joint). Angular misalignment (e.g., between axis 117 of sensor 102 and axis 119) is allowed for by using an arrangement of compliant beams compliant to misalignment but stiff to other displacements. When angular misalignment of the sensor relative to the housing occurs, one or more compliant beams deform to accommodate the misalignment.

Specifically, an embodiment couples a robotic actuator 101 to a reaction torque sensor 102 through a compliant element 103. The compliant element has flexibility in two rotational axes 111, 112 and three translational axes 113, 114, 115. The one non-compliant rotational axis 116 of the compliant element is aligned with the sensing axis 117 of sensor 102. As a result, load sensing accuracy is significantly improved. The robotic actuator is constrained by a support system 104. The support system restricts the movement of the actuator in directions not aligned with the output movement direction of the robotic actuator, such as directions 121, 122 (which are not aligned with the rotation axis 119 of the actuator). This load sensing accuracy improvement is achieved, at least in part, because the compliant element, in combination with the support system, significantly reduces loads from the system (which are acting in directions not aligned with the sensing axis of the load sensor) being passed through to the load sensor. These non-aligned loads can cause erroneous load readings or greater uncertainty in measured load value.

Although many arrangements of the non-compliant axis 116 of the compliant element to the load sensing axis 117 may function satisfactorily, the load sensing accuracy of the system can be optimized by arranging the non-compliant axis of the compliant element to be colinear to the sensing axis. This arrangement eliminates or reduces any forces or moments which may be created due to any linear distance between the non-compliant axis and the sensing axis from acting on the force sensor, or any misalignment of forces acting from the compliant element to the load sensor. However, some embodiments do not necessarily require a colinear arrangement between axes 116, 117.

Reaction torque load sensors may also be used to measure linear force. An embodiment senses the linear force of a system by measuring the reaction torque at an actuator. For instance, in a rack and pinion linear actuator (where the pinion is driven by a motor), the reaction torque of the pinion motor can be measured through embodiments of the compliant element described herein to sense the overall linear force output of the actuator.

Figures 3A, 3B:
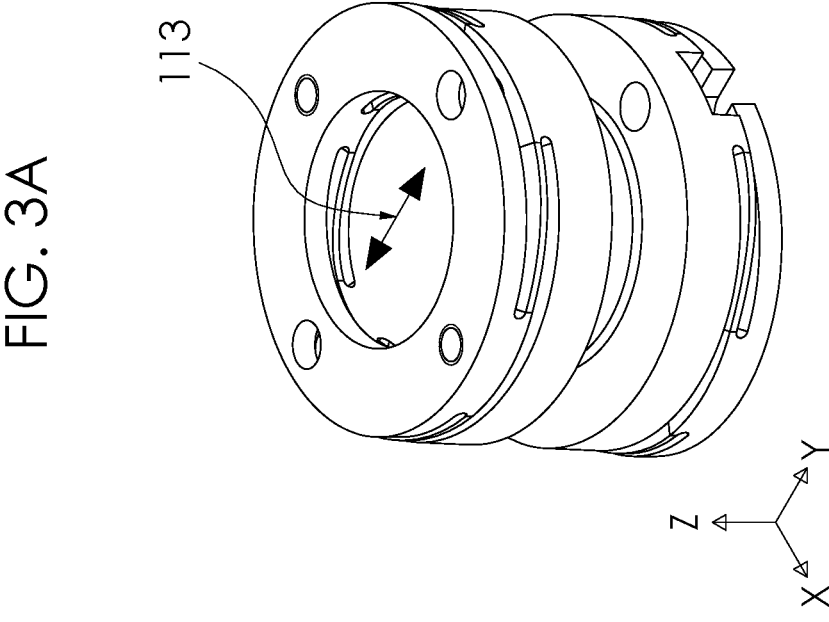
Figure 3D:
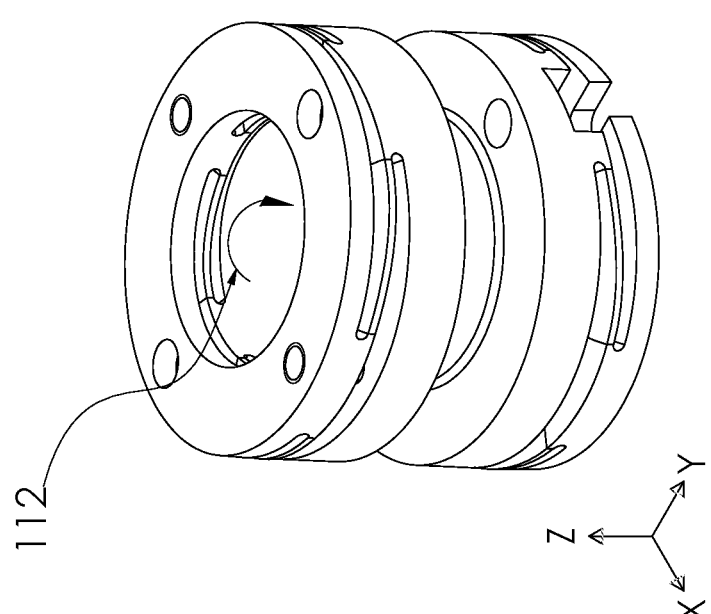
Figure 3C:
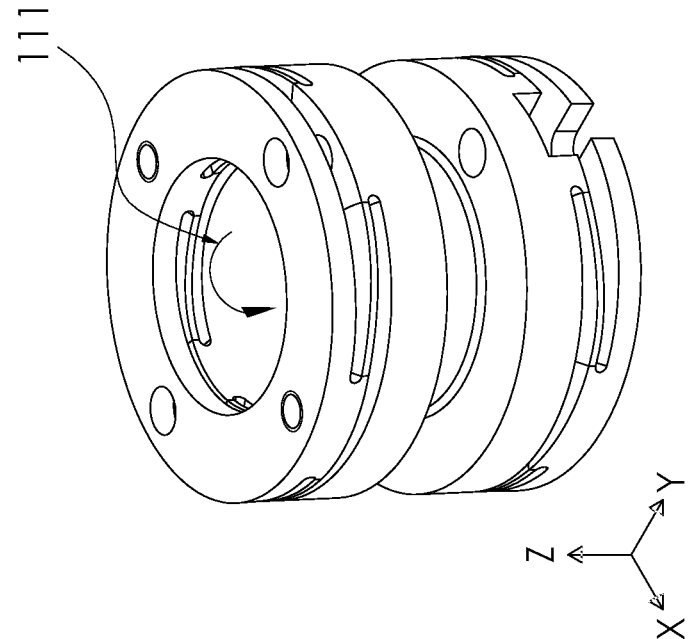
Figure 3E:
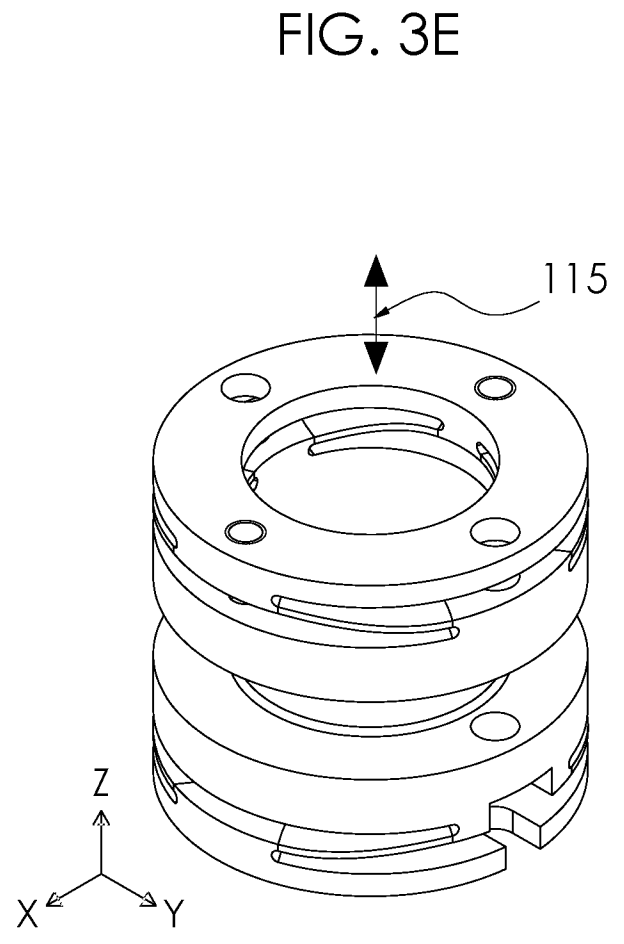

Although many arrangements of the non-compliant axis (e.g., axis 116) of the compliant element to the load sensing axis (e.g., axis 117) of the load sensor may function satisfactorily, an embodiment optimizes the load sensing accuracy of the system by arranging the non-compliant axis of the compliant element to be colinear to the sensing axis. This arrangement eliminates or strongly reduces any forces or moments which may be created due to any distance between the non-compliant axis and the sensing axis from acting on the force sensor, or any misalignment of forces acting from the compliant element to the load sensor. An embodiment is comprised of beams 131, 132, 133, 134 in a first set of beams and beams 131', 132', 133', 134' in a second set of beams. In the first set of beams all four beams occupy plane 118. In the second set of beams all four beams occupy plane 118'. The beams in each of the first and second sets are respectively arranged in a circle and are equally spaced from one another. Together, each set of four beams comprises a single compliant joint which is compliant in three directions (one translational and two rotational) and non-compliant in three directions (two translational and one rotational). For the embodiment of FIG. 4B, the beams of both the first and second sets of beams are compliant in the same three directions (one translational and two rotational) and non-compliant in the same three directions (two translational and one rotational). These compliant joints or beams sets in planes 118, 118' are not coplanar with each other. The resulting arrangement of two sets of beams is thus compliant in five directions (three translational and two rotational). The two additional translational degrees of freedom are achieved because the distance 106 between the joints allows for a rotation of one joint to translate the other joint. For example, in FIG. 3A the rotation of a first joint causes a second joint to translate. The translated second joint may rotate in the opposite direction to the first joint. This ensures the ends of the compliant element stay parallel (or at least reduces any error). This embodiment puts the load sensing element (in this case a reaction torque sensor) between the two joints 141, 142 in the space that is required to achieve the necessary five degrees of freedom, thus eliminating the need for a separate load sensing element. For example, the load sensing element may include strain gauge 175 located on the smaller diameter portion of compliant element 103 between joints 141, 142.

Figures 4A, 4B, 4C:
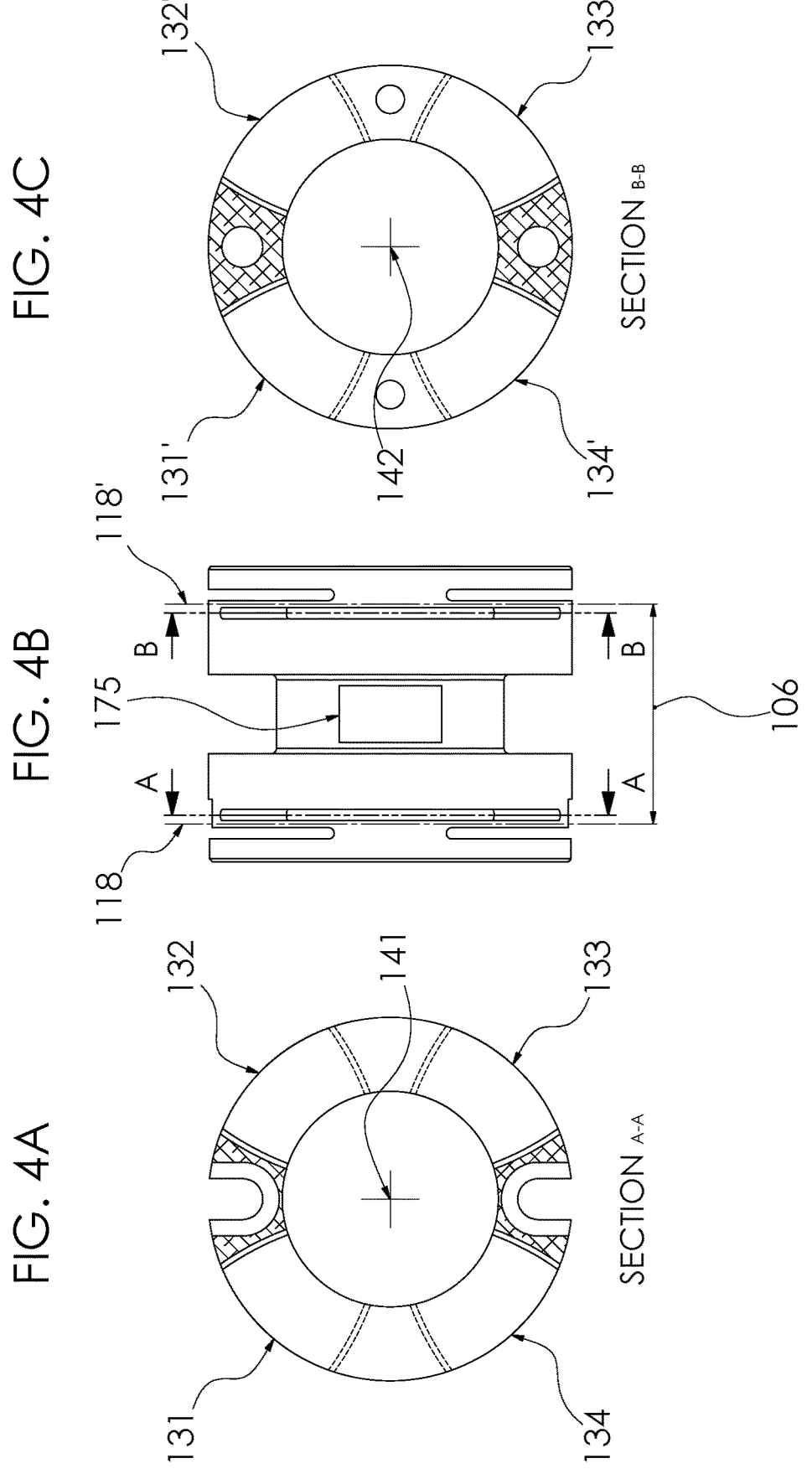
FIGS. 4A, 4B, 4C respectively illustrate end, perspective, and additional end views of a bracket in an embodiment.
Figure 5B:
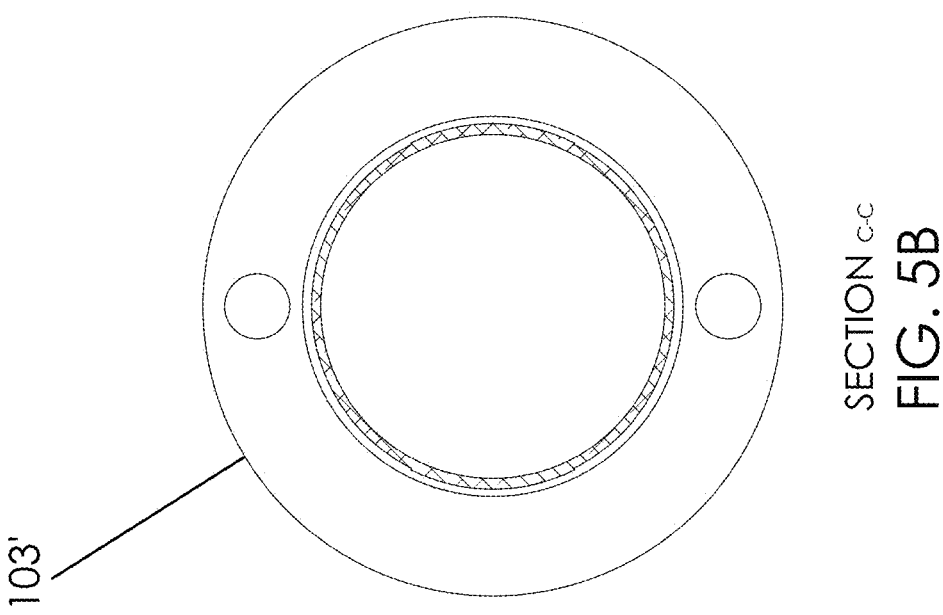
FIGS. 5A, 5B respectively illustrate side and cross-sectional views of an embodiment of a bracket (103').
Figure 5A:
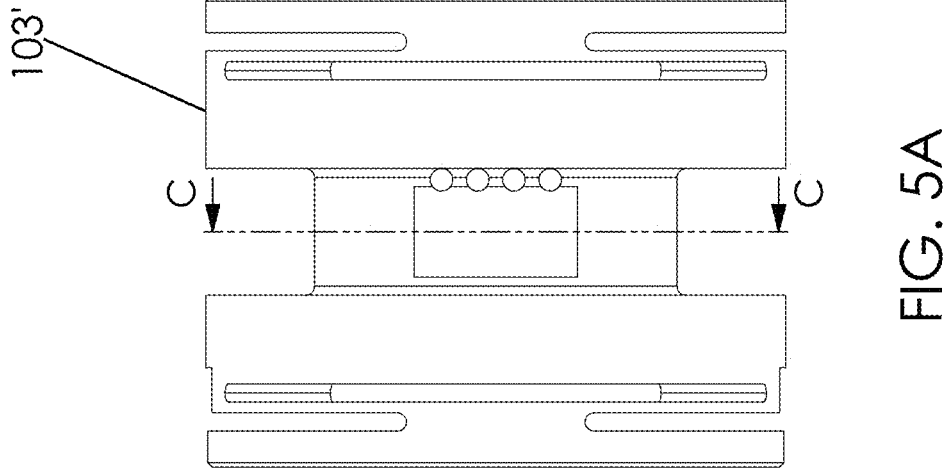
Figure 6B:
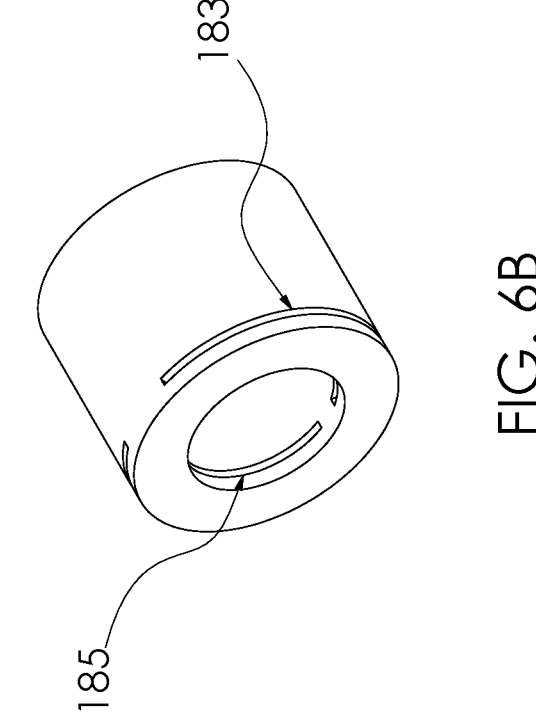
FIGS. 6A, 6B, 6C, 6D, 6E illustrate various stages of construction of an embodiment of a bracket.
Figure 6A:
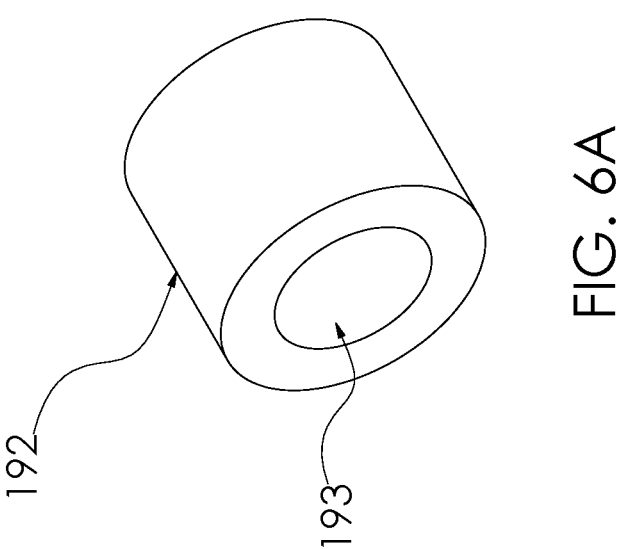
Figures 6C, 6D:
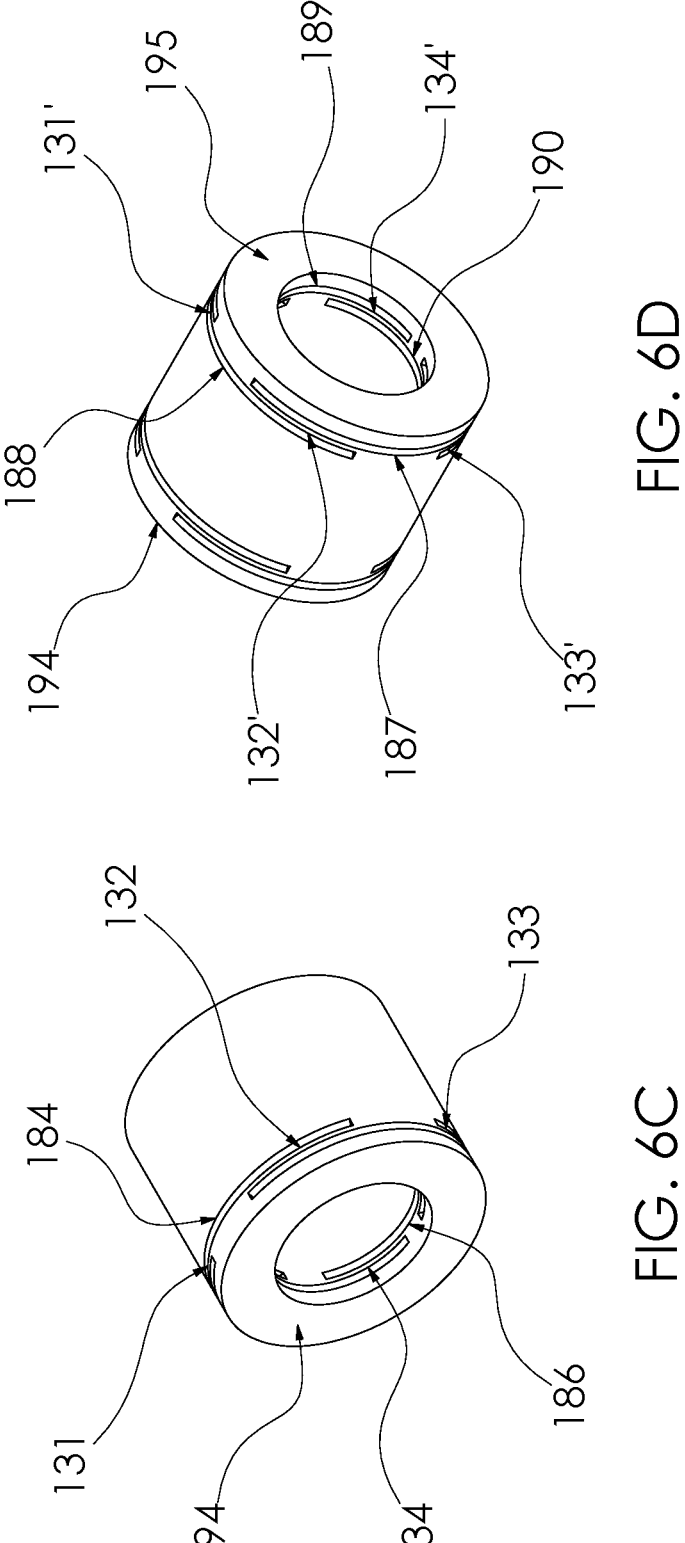
Figure 6E:
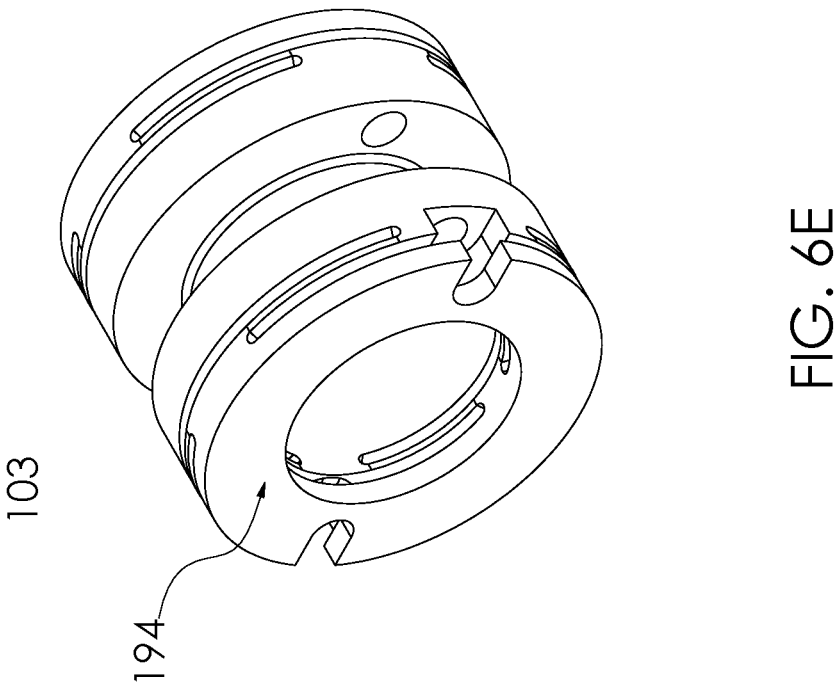

While in the embodiment of FIG. 4B sensor 175 is between joints 141, 142, in other embodiments the strain gauge of the sensor could be placed at other locations in relation to joints 141,142 and still function. For example, the strain gauge may be located on the shaft 177 but not in between joints 141, 142.

Thus, an embodiment uses a compliant mechanism that is compliant in five of six degrees of freedom and non-compliant in one degree of freedom. In other words, element 103 is non-compliant for rotation about axis 116. The compliant element is attached to a reaction torque sensor 175 such that the axis of the one non-compliant degree of freedom 116 is compatible with the load sensor and is aligned to the load sensing axis 117. Element 103 is also attached to a system (link 179) to be measured. The system is constrained in such a way that loads which are to be measured by the load sensor are unconstrained by the support system (i.e., allowed to rotate about axis 117). The support system may include housing 178. Motor 101 constrains the system.

As addressed in The Handbook of Compliant Mechanisms, First Edition, 2013, and regarding "compliant element" as that term is used herein, if something bends to do what it is meant to do, then it is compliant. If the flexibility that allows it to bend also helps it to accomplish something useful, then it is a compliant mechanism. Traditionally stiff or rigid parts are connected with stiff or rigid hinges (like a door on its hinge or a wheel on an axle) or sliding joints to achieve desired movements. However, compliant elements are not restricted to rigid parts connected with rigid joints. Instead, such compliant element systems (e.g., natural elements) are flexible instead of stiff, and allow motion from bending flexible parts. Such systems use flexibility to achieve movement. Thus, within mechanical engineering and similar disciplines, a compliant mechanism is a flexible mechanism that achieves desired force and motion transmission through elastic body deformation. It gains some or all of its motion from the relative flexibility of its members rather than from rigid-body joints alone. These compliant elements may be monolithic (single-piece) or jointless structures. Some common devices that use compliant mechanisms are backpack latches and paper clips.

A degree of freedom for a compliant element, as used herein, is a direction of translation or rotation in which the compliant element can bend.

Thus, embodiments address issues common in load sensing applications. To achieve high accuracy, embodiments of force sensing systems couple the system to be measured to a load cell in a way that allows for compliance in directions that are not in line with the load sensor's sensing axis. In contrast, to introduce this compliance conventional load sensors are integrated with ball joints or other elements utilizing rolling or sliding to create compliance in directions which are not aligned with the load sensing axis. These rolling or sliding elements have inherent disadvantages such as a limited rolling or sliding life, friction (which may transmit misaligned forces and thus possibly cause error), or unwanted compliance in the load sensing axis (such as backlash in the case of reversing loads). The use of these elements also increases the overall size and weight of the robotic load sensing actuator because rolling or sliding elements are typically discrete components that require integration.

To address these disadvantages of rolling or sliding elements, embodiments use flexible compliant mechanisms to introduce compliance to a force sensing robotic actuator. Embodiments have long service life, very low resistance to motion, and zero backlash. As used herein, "backlash" concerns interplay between adjacent movable parts (e.g., a series of gears). Embodiments are also much more compact than a comparable rolling or sliding system, and have fewer components. In an embodiment, flexible elements (and the features which are required to integrate those flexible elements into the load sensing actuator) are achieved in just one component (e.g., bracket 103). The component requires little to no maintenance and will likely last longer than the robotic system it is applied in.

As noted above, a purpose of the flexible elements (e.g., beams 131, 132, 133, 134, 131', 132', 133', 134') is to allow for compliance in directions not aligned with the load sensing axis. Thus, an embodiment uses a geometry with thin beams because, for example, such beams result in lower bending stresses in the material and are compliant. Embodiments use one or more materials (e.g., alloys) with a low elastic modulus that reduce bending stresses that result from the expected misalignment.

The compliant elements support large loads and stresses that result from: (a) loads in the sensing axis, and (b) stresses from bending in the other directions. Thus, a material with a high yield strength and/or fatigue strength is used in embodiments so that the compliant element does not fail under high loads or repeated loading.

The flexible elements may be subject to compressive loads in some designs. If this is the case, embodiments provide that the geometry and elastic modulus of the flexible elements have a buckling strength greater than the expected compressive load. Thus, in some embodiments the compliant elements are shorter and thicker to support compressive loads. Using materials with a high elastic modulus will also increase buckling strength.

Because of the conflicting requirements of buckling strength and compliance when loads across the flexible element are in compression, embodiments strike a balance with an appropriate shape and elastic modulus that results in a compliant design that does not buckle. For example, after the geometry and elastic modulus was determined Applicant found a material with a yield strength and fatigue strength that suitable for certain applications. An embodiment uses titanium for more demanding applications where the compliant element is highly loaded and yet must be as compact as possible. However, Aluminum alloys are suitable in less demanding environments.

Given compression loading requirements of the compliant element, material stiffness needed to prevent buckling for a given shape of element can be determined. Because higher material stiffnesses result in a less compliant element, several embodiments utilize a compliant element with a material with just enough stiffness to not buckle under the highest expected loads. This maximizes compliance while still meeting design criteria.

Embodiments are arranged together such that as a system the compliant element is capable of deflecting in five of six degrees of freedom.

An embodiment includes a one-piece construction (monolithic) of the compliant element, although other embodiments are not so limited. Multiple pieces may be arranged to form a non-monolithic compliant element in other embodiments. For example, pieces of the element may be coupled to each other via fasteners and the like.

Embodiments use symmetrical designs of flexible elements to keep the stresses experienced by the material evenly distributed, which results in an overall stronger design.

A perfect colinear alignment of the non-compliant axis 116 of the compliant element and the load sensing axis 117 of the load sensor is not required for all embodiments to function. For instance, if a moment load aligned with the non-compliant axis of the compliant element is applied through the compliant element and there is a linear distance between the axis 117 of the load sensing element and the non-compliant axis of the compliant element 116, a shear load is created which acts on the load sensing element and is proportional to the distance between the two axes and the moment load. Because this shear load is proportional to the load which the system is intended to measure, any error that is generated by the moment will be consistent for any load. Thus, these errors created by the non-collinear axes can be accounted for by calibration or other methods and may not substantially affect the sensing system accuracy.

Examples of further embodiments are described below.

Example 1. An exoskeleton robotic system comprising a shaft (177) coupled to a linkage (179). A bearing (104) couples the shaft to a housing (178). An actuator (101) includes a motor (101). An exoskeleton robotic joint (180) is configured to rotate the shaft and linkage about the bearing. A reaction torque sensor (102) configured to sense torque transmitted to the reaction torque sensor via the joint in response to the motor rotating the shaft and the linkage. A bracket (103) includes: (a) a tube having an exterior wall (192) and a hollow interior (193), (b) first, second, third, and fourth voids (183, 184, 185, 186) that each extend from the exterior wall to the hollow interior; (c) a first beam 132 between the first and second voids, a second beam 131 between the third and second voids, a third beam 133 between the first and fourth voids, and a fourth beam 134 between the third and fourth voids; wherein the bracket couples the actuator to the housing.

A bearing, as used herein, is a machine element that constrains relative motion to only the desired motion, and reduces friction between moving parts. The design of the bearing may, for example, provide for free linear movement of the moving part or for free rotation around a fixed axis; or, it may prevent a motion by controlling the vectors of normal forces that bear on the moving parts. Most bearings facilitate the desired motion by minimizing friction. Bearings are classified broadly according to the type of operation, the motions allowed, or to the directions of the loads (forces) applied to the parts. Embodiments are not limited using bearings or to any one type of bearing.

The embodiment allows for continuous rotation of the motor shaft based on the bearings. This arrangement of the bearings, shaft, linkage, actuator, and reaction torque sensor ensures that non-torque loads are isolated (or largely isolated) from acting on the torque sensor. Torque sensing accuracy is maximized so the performance of the robotic joint is improved.

In an embodiment the axial distance 106 between the first set of beams and the second set of beams allows each set of beams (which each have 3 degrees of freedom) to act together to have 5 degrees of freedom and achieve torque isolation.

Example 2. The system of example 1, wherein: the tube has a proximal third, a distal third, and a middle third between the proximal and distal thirds. A minimum outer diameter of the proximal third of the tube is greater than a maximum outer diameter of the middle third of the tube. A minimum outer diameter of the distal third of the tube is greater than a maximum outer diameter of the middle third of the tube. At least a portion of the reaction torque sensor is located on the middle third of the tube.

As a result, the embodiment has a "dumbbell" shape such as seen in FIG. 4B. This midsection axially separates the proximal and distal thirds of the tube and is thinner to provide a location to attach sensors (such as strain gauges) to measure the reaction torque passing through the tube. The axial separation between the ends allows pivoting action of the compliant element(s) at one end to translate to the other end of the tube. This allows for two additional translational degrees of freedom which, as mentioned elsewhere herein, may help isolate non-torque loads from acting on the load sensing elements.

Alternative version of example 2. The system of example 1, wherein: the tube has a proximal portion, a distal portion, and a middle portion between the proximal and distal portions. A minimum outer diameter of the proximal portion of the tube is greater than a maximum outer diameter of the middle portion of the tube. A minimum outer diameter of the distal portion of the tube is greater than a maximum outer diameter of the middle portion of the tube; at least a portion of the reaction torque sensor is located on the middle portion of the tube.

Example 3. The system of example 2, wherein the reaction torque sensor includes a strain gauge located on the exterior wall of the middle third of the tube.

The middle section of the tube is narrowed to maximize the strain in the tube under torque loading. The maximum strain occurs at the outside surface of the thinned middle section of the tube. Thus, this is an advantageous location for the strain gauge since this maximizes the sensitivity of the strain gauge to the applied torque. Maximizing sensitivity also minimizes the impact of any sensor error since these are typically constant. Additionally, in some embodiments there may be uninterrupted thick flanges, lips, collars, faces, or projections at the transition from either end of the tube to the middle section of the tube to apply Saint-Venant's Principle and reduce the strain gradient in the middle section where the strain gages are applied, further improving the accuracy of the sensor.

In an embodiment, having thick flanges, lips, collars, faces, or projections on either end of the middle section helps ensure that when the bracket is loaded in torsion the thin middle section is loaded evenly. This helps strain gages accurately measure the torque. Without thick flanges, lips, collars, faces, or projections there would be a stress concentration at the locations where compliant beams attach to the middle section, which is to be avoided in at least some embodiments.

Example 3.1. The system of example 3, wherein the shaft and the bearing are both included in the hollow interior of the bracket.

Example 3.2 The system of example 3.1, wherein: the bracket includes: (a) additional first, additional second, additional third, and additional fourth voids (187, 188, 189, 190) that each extend from the exterior wall to the hollow interior; (c) an additional first beam (132') between the additional first and additional second voids, an additional second beam 131' between the additional third and additional second voids, an additional third beam 133' between the additional first and additional fourth voids, and an additional fourth beam 134' between the additional third and additional fourth voids. The reaction torque sensor is between the first void and the additional first void.

Example 4. The system of example 1, wherein: the tube has a long axis (116) extending through the hollow interior and from a first end (194) of the bracket to a second end (195) of the bracket. First (196), second (197), third (198), and fourth (199) axes are all parallel to the long axis. The first axis intersects the first beam and the first and second voids. The second axis intersects the second beam and the third and second voids. The third axis intersects the third beam and the first and fourth voids. The fourth axis intersects the fourth beam and the third and fourth voids.

A tube may have various cross-sections, such as circular, ovular, rectilinear, and the like. Embodiments may use various arrangements of voids and beams to provide a system with compliance. Such arrangements have a low stiffness in non-torque directions so any relative movement between the ends of the tube (which may result from the rotation of shaft (177) or from imperfections in the bearing (104)) does not apply significant loading to the sensor and introduce error.

In an embodiment, the beams create a compliant element.

Example 5. The system of example 4, wherein: the bracket includes a first flange (which includes face 194) at the first end of the bracket and a second flange (which includes face 195) at the second end of the bracket. Each of the first, second, third, and fourth axes intersect both the first and second flanges. The first flange is between the actuator and the second flange.

As used herein, a "flange" is a projecting flat rim, collar, or rib on an object, serving to strengthen or attach the object to something else. The bracket couples the actuator to the housing and is the path through which the reaction torque of the actuator can pass through to the housing.

Alternative version of example 5. The system of example 4, wherein: the bracket includes a first collar at the first end of the bracket and a second collar at the second end of the bracket; each of the first, second, third, and fourth axes intersect both the first and second collars; the first collar is between the actuator and the second collar.

Alternative version of example 5. The system of example 4, wherein: the bracket includes a first face (194) at the first end of the bracket and a second face (195) at the second end of the bracket; each of the first, second, third, and fourth axes intersect both the first and second faces; the first face is between the actuator and the second face.

Alternative version of example 5. The system of example 4, wherein: each of the first, second, third, and fourth axes intersect both the first and second ends; the first end is between the actuator and the second end.

Example 6. The system of example 4, wherein a fifth axis (200) is parallel to the long axis and intersects the second void but does not intersect the first void and does not intersect the third void.

As a result, thicker portions of the bracket are used to help form thinner beams which in turn allow for the proper balance between compliance and resistance.

Example 7. The system of example 4 wherein the bracket includes: (a) additional first, additional second, additional third, and additional fourth voids (187, 188, 189, 190) that each extend from the exterior wall to the hollow interior; (c) an additional first beam (132') between the additional first and additional second voids, an additional second beam 131' between the additional third and additional second voids, an additional third beam 133' between the additional first and additional fourth voids, and an additional fourth beam 134' between the additional third and additional fourth voids.

The second set of beams and voids compliment the first set of beams and voids, in congregate the two sets of beams form a compliant element which can achieve the desired torque isolation.

Example 8. The system of example 7, wherein the additional first axis intersects the additional first beam and the additional first and additional second voids, the second axis intersects the additional second beam and the additional third and additional second voids, the third axis intersects the additional third beam and the additional first and additional fourth voids, and the fourth axis intersects the additional fourth beam and the additional third and additional fourth voids.

While several of the above examples address the geometry of compliant elements, in other embodiments such geometry/structure may not be used. For example, other embodiments may use compliant element that includes flexible shaft couplings. Such couplings may utilize a 5 degree of freedom flexure to transmit torque and may be constructed with a single helical slot. Other compliant elements may arrange slots so that the beams are not coplanar.

Example 9. The system of example 4, wherein: the bracket couples the actuator to the housing; and the housing couples the bracket to the bearing.

This arrangement of bracket, housing, and bearings provides load isolation properties. Non-torque loads act through the bearings to the housing, thereby bypassing the bracket. Torque loads are unsupported by the bearings and act through the bracket to the housing. In other words, the support system (bearings 104) transfers non-torque loads (such as 121 and 122) to housing 178 and prevents these loads from acting on the load sensor. The bearings do not support torque loads 127. These torque loads pass from the shaft 177 to the actuator 101 to the bracket 103 and to the housing 178.

Example 9.1 The system of example 4, wherein: the bracket couples to the actuator via the first flange; and the bracket couples to the housing via the second flange.

Together with the bearings, this coupling ensures the reaction torque from the actuator passes through the bracket to be sensed.

Alternative version of example 9.1 The system of example 4, wherein: the bracket couples to the actuator via the first face; and the bracket couples to the housing via the second face.

Alternative version of example 9.1 The system of example 4, wherein: the bracket couples to the actuator via the first end; and the bracket couples to the housing via the second end.

Example 10. The system of example 9, wherein the bracket is a compliant element.

Example 11. The system of Example 9, wherein: the bracket has first, second, and third translational degrees of freedom; the bracket has first and second rotational degrees of freedom but not a third rotational degree of freedom.

Example 12. The system of example 9, wherein the bracket is statically coupled to the reaction torque sensor and is statically coupled to the housing.

For example, the bracket does not rely on ball-and-socket or sliding joints to transmit torque loads between itself, the reaction torque sensor, or the housing.

Example 13. The robotic system according to any of examples 1-12, wherein the bracket is not slidingly coupled to the housing.

Example 14. The system of example 1, wherein the bracket is a compliant mechanism having compliance: (a) along each of X, Y, Z axes (113, 114, 115), and (b) about two of the X, Y, Z axes (axis related to rotation 111, axis related to rotation 112) but not a third of the X, Y, Z axes (116).

Example 15. The system of example 14, wherein: the motor is configured to rotate the shaft about the third of the X, Y, Z axes; and the reaction torque sensor is configured to sense torque transmitted about a sensing axis (124); the sensing axis is parallel to the third of the X, Y, Z axes (116).

Example 16. The system of example 15, wherein the sensing axis is colinear with the third of the X, Y, Z axes (116).

Example 17. The system of example 15, wherein: the first beam is configured to be in tension when the second beam is in compression in response to a first force on the first beam; and the first beam is configured to be in compression when the second beam is in tension in response to a second force on the first beam; the first and second forces are directed along one of the X, Y, Z axes; the first and second forces are opposite in direction to one another.

Example 18. The system of example 15, wherein the reaction torque sensor includes a Wheatstone bridge.

An embodiment uses a Wheatstone bridge. In conventional systems, Wheatstone bridges may reduce the error introduced by off-axis loads. Still, this reduced amount of error may still be too much error in certain situations. Embodiments addressed herein improve Wheatstone bridge arrangements to further reduce the error introduced by off-axis loads. This can be important in certain technical spaces, such as robotics used in the medical space. Specific examples that demand higher precision/lower error include robotics used for rehabilitation of humans (e.g., stroke victims). Applicant determined such systems have a need for extremely high torque measurement accuracy (e.g., to be able to sense small patient forces while also supporting the heavy weight of the robot). As a result, embodiments addressed herein were formulated (at least in part) to address this problem.

Example 19. The system of example 1, wherein the bracket is monolithic.

Example 20. The system of example 19, wherein the bracket has a circular cross-section.

Some embodiments include a circular cross section to better support torque loads. Applicant determined other geometries (e.g., a square tube) may also function but may be inherently weaker than a comparable circular cross section.

Example 21. The system of example 20, wherein the bracket has a dumbbell shape.

Example 22. The system of example 19, wherein: the tube has a long axis (116) extending through the hollow interior and from a first end (194) of the bracket to a second end (195) of the bracket; the first, second, third, and fourth beams are coplanar with each other in a plane that is orthogonal to the long axis.

Planar arrangements of beams are beneficial in some embodiments, such as in robotic applications, because the arrangement minimizes the axial length of the overall joint. Usually, the diameter of the joint is determined by the motor selection and cannot be reduced without impacting functionality, so the axial length is the only dimension which can be optimized. Thus, planar beams minimize the size of the overall joint.

Example 23. The system of example 22, wherein: the first beam includes at least one of titanium, aluminum, steel, plastic, or combinations thereof; the second beam includes at least one of titanium, aluminum, steel, plastic, or combinations thereof.

Example 24. The system of example 23, wherein: the tube has a long axis (116) extending through the hollow interior and from a first end (194) of the bracket to a second end (195) of the bracket; a plane, which is orthogonal to the long axis, intersects the shaft, the bearing, and the bracket.

Example 1a. A robotic system comprising a shaft coupled to a robotic appendage a bearing that couples the shaft to a housing. An actuator includes a motor. A robotic joint rotates the shaft and linkage via the bearing. A torque sensor senses torque created when the motor rotates the appendage. A bracket includes: (a) a rod having an exterior wall, (b) first and second voids in the exterior wall; (c) a beam between the first and second voids, and (d) first and second ends. The bracket is a compliant element and couples: (a) to the actuator via the first end, (b) to the housing via the second end, (c) the actuator to the housing.

Example 2a. The system of example 1a, wherein the torque sensor includes a strain gauge on the bracket between the first and second ends.

Example 3a. The system of example 2a, wherein the bracket has compliance: (a) along each of X, Y, Z axes, and (b) about two of the X, Y, Z axes but not a third of the X, Y, Z axes.

Example 4a. The system of example 3a, wherein: the motor is configured to rotate the shaft about the third of the X, Y, Z axes; the torque sensor is to sense torque transmitted about a sensing axis; and the sensing axis is colinear with the third of the X, Y, Z axes.

Example 5a. The system of example 4a, wherein: the rod has a middle third between proximal and distal thirds; the middle third has a smaller maximum outer diameter than the proximal and distal thirds; the strain gauge is located on the middle third of the rod.

Example 6a. The system of example 5a, wherein the rod is hollow and the shaft and the bearing are both included in a hollow interior of the bracket.

Example 1b. An exoskeleton robotic system comprising a shaft (177) coupled to a linkage (179). A bearing (104) couples the shaft to a housing (178), An actuator (101) includes a motor (101). An exoskeleton robotic joint (180) is configured to rotate the shaft and linkage about the bearing. A reaction torque sensor (102) is configured to sense torque transmitted to the reaction torque sensor via the joint in response to the motor rotating the shaft and the linkage. A bracket (103) includes a tube having an exterior wall (192) and a hollow interior (193). The bracket couples the actuator to the housing. The tube includes at least one void and at least one beam collectively configured to provide stiffness in non-torque directions so movement between opposing ends of the tube do not apply loading to the sensor.

Example 1c. An exoskeleton robotic system comprising a shaft (177) coupled to a linkage (179). A bearing (104) couples the shaft to a housing (178). An actuator (101) includes a motor (101). An exoskeleton robotic joint (180) is configured to rotate the shaft and linkage about the bearing. A reaction torque sensor (102) is configured to sense torque transmitted to the reaction torque sensor via the joint in response to the motor rotating the shaft and the linkage. A bracket (103) includes: (a) a tube having an exterior wall (192) and a hollow interior (193), (b) first, second, third, and fourth voids (183, 184, 185, 186) that each extend from the exterior wall to the hollow interior; (c) a first beam 132 between the first and second voids, a second beam 131 between the third and second voids, a third beam 133 between the first and fourth voids, and a fourth beam 134 between the third and fourth voids. The bracket couples the actuator to the housing.

Example 2c. The system of example 1c, wherein: the tube has a proximal third, a distal third, and a middle third between the proximal and distal thirds; a minimum outer diameter of the proximal third of the tube is greater than a maximum outer diameter of the middle third of the tube; a minimum outer diameter of the distal third of the tube is greater than a maximum outer diameter of the middle third of the tube; at least a portion of the reaction torque sensor is located on the middle third of the tube.

Alternative version of example 2c. The system of example 1c, wherein: the tube has a proximal portion, a distal portion, and a middle portion between the proximal and distal portions; a minimum outer diameter of the proximal portion of the tube is greater than a maximum outer diameter of the middle portion of the tube; a minimum outer diameter of the distal portion of the tube is greater than a maximum outer diameter of the middle portion of the tube; at least a portion of the reaction torque sensor is located on the middle portion of the tube.

Example 3c. The system of example 2c, wherein the reaction torque sensor includes a strain gauge located on the exterior wall of the middle third of the tube.

Example 3.1c. The system according to any of examples 1c-3c, wherein the shaft and the bearing are both included in the hollow interior of the bracket.

Example 3.2c The system according to any of examples 1c-3.1c, wherein: the bracket includes: (a) additional first, additional second, additional third, and additional fourth voids (187, 188, 189, 190) that each extend from the exterior wall to the hollow interior; (c) an additional first beam (132') between the additional first and additional second voids, an additional second beam 131' between the additional third and additional second voids, an additional third beam 133' between the additional first and additional fourth voids, and an additional fourth beam 134' between the additional third and additional fourth voids; the reaction torque sensor is between the first void and the additional first void.

Example 4c. The system according to any of examples 1c-3.2c, wherein: the tube has a long axis (116) extending through the hollow interior and from a first end (194) of the bracket to a second end (195) of the bracket; a first (196), second (197), third (198), and fourth (199) axes that are all parallel to the long axis; the first axis intersects the first beam and the first and second voids, the second axis intersects the second beam and the third and second voids, the third axis intersects the third beam and the first and fourth voids, and the fourth axis intersects the fourth beam and the third and fourth voids.

Example 5c. The system of example 4c, wherein: the bracket includes a first flange at the first end of the bracket and a second flange at the second end of the bracket; each of the first, second, third, and fourth axes intersect both the first and second flanges; the first flange is between the actuator and the second flange.

Alternative version of example 5c. The system of example 4c, wherein: the bracket includes a first collar at the first end of the bracket and a second collar at the second end of the bracket; each of the first, second, third, and fourth axes intersect both the first and second collars; the first collar is between the actuator and the second collar.

Alternative version of example 5c. The system of example 4c, wherein: the bracket includes a first face (194) at the first end of the bracket and a second face (195) at the second end of the bracket; each of the first, second, third, and fourth axes intersect both the first and second faces; the first face is between the actuator and the second face.

Alternative version of example 5c. The system of example 4c, wherein: each of the first, second, third, and fourth axes intersect both the first and second ends; the first end is between the actuator and the second end.

Example 6c. The system according to any of examples 4c-5c, wherein a fifth axis (200) is parallel to the long axis and intersects the second void but does not intersect the first void and does not intersect the third void.

Example 7c. The system according to any of examples 1c-6c wherein the bracket includes: (a) additional first, additional second, additional third, and additional fourth voids (187, 188, 189, 190) that each extend from the exterior wall to the hollow interior; (c) an additional first beam (132') between the additional first and additional second voids, an additional second beam 131' between the additional third and additional second voids, an additional third beam 133' between the additional first and additional fourth voids, and an additional fourth beam 134' between the additional third and additional fourth voids.

Example 8c. The system of example 7c, wherein the additional first axis intersects the additional first beam and the additional first and additional second voids, the second axis intersects the additional second beam and the additional third and additional second voids, the third axis intersects the additional third beam and the additional first and additional fourth voids, and the fourth axis intersects the additional fourth beam and the additional third and additional fourth voids.

Example 9c. The system according to any of examples 1c-8c, wherein: the bracket couples the actuator to the housing; and the housing couples the bracket to the bearing.

Example 9.1c The system according to any of examples 1c-9c, wherein: the bracket couples to the actuator via the first flange; and the bracket couples to the housing via the second flange.

Alternative version of example 9.1c The system according to any of examples 1c-9c, wherein: the bracket couples to the actuator via the first end; and the bracket couples to the housing via the second end.

Example 10c. The system according to any of examples 1c-9c, wherein the bracket is a compliant element.

Example 11c. The system according to any of examples 1c-10c, wherein: the bracket has first, second, and third translational degrees of freedom; the bracket has first and second rotational degrees of freedom but not a third rotational degree of freedom.

Example 12c. The system according to any of examples 1c-11c, wherein the bracket is statically coupled to the reaction torque sensor and is statically coupled to the housing.

Example 13c. The system according to any of examples 1c-12c, wherein the bracket is not slidingly coupled to the housing.

Example 14c. The system according to any of examples 1c-13c, wherein the bracket is a compliant mechanism having compliance: (a) along each of the X, Y, Z axes (113, 114, 115), and (b) about two of the X, Y, Z axes (axis related to rotation 111, axis related to rotation 112) but not a third of the X, Y, Z axes (116).

Example 15c. The system of example 14c, wherein: the motor is configured to rotate the shaft about the third of the X, Y, Z axes; and the reaction torque sensor is configured to sense torque transmitted about a sensing axis (124); the sensing axis is parallel to the third of the X, Y, Z axes (116).

Example 16c. The system according to any of examples 14c-15c, wherein the sensing axis is colinear with the third of the X, Y, Z axes (116).

Example 17c. The system according to any of examples 1c-16c, wherein: the first beam is configured to be in tension when the second beam is in compression in response to a first force on the first beam; and the first beam is configured to be in compression when the second beam is in tension in response to a second force on the first beam; the first and second forces are directed along one of the X, Y, Z axes; the first and second forces are opposite in direction to one another.

Example 18c. The system according to any of examples 1c-17c, wherein the reaction torque sensor includes a Wheatstone bridge.

Example 19c. The system according to any of examples 1c-18c, wherein the bracket is monolithic.

Example 20c. The system according to any of examples 1c-19c, wherein the bracket has a circular cross-section.

Example 21c. The system according to any of examples 1c-20c, where in the bracket has a dumbbell shape.

Example 22c. The system according to any of examples 1c-21c, wherein: the tube has a long axis (116) extending through the hollow interior and from a first end (194) of the bracket to a second end (195) of the bracket; the first, second, third, and fourth beams are coplanar with each other in a plane that is orthogonal to the long axis.

Example 23c. The system according to any of examples 1c-22c, wherein: the first beam includes at least one of titanium, aluminum, steel, plastic, or combinations thereof; the second beam includes at least one of titanium, aluminum, steel, plastic, or combinations thereof.

Example 24c. The system according to any of examples 1c-23c, wherein: the tube has a long axis (116) extending through the hollow interior and from a first end (194) of the bracket to a second end (195) of the bracket; a plane, which is orthogonal to the long axis, intersects the shaft, the bearing, and the bracket.

Example 1d. A robotic system comprising a shaft coupled to a robotic appendage; a bearing that couples the shaft to a housing. An actuator includes a motor. A robotic joint rotates the shaft and linkage via the bearing. A torque sensor senses torque created when the motor rotates the appendage. A bracket includes: (a) a rod having an exterior wall, (b) first and second voids in the exterior wall; (c) a beam between the first and second voids, and (d) first and second ends. The bracket is a compliant element and couples: (a) to the actuator via the first end, (b) to the housing via the second end, (c) the actuator to the housing.

Example 2d. The system of example 1d, wherein the torque sensor includes a strain gauge on the bracket between the first and second ends.

Example 3d. The system according to any of examples 1d-2d, wherein the bracket has compliance: (a) along each of X, Y, Z axes, and (b) about two of the X, Y, Z axes but not a third of the X, Y, Z axes.

Example 4d. The system of example 3d, wherein: the motor is configured to rotate the shaft about the third of the X, Y, Z axes; the torque sensor is to sense torque transmitted about a sensing axis; and the sensing axis is colinear with the third of the X, Y, Z axes.

Example 5d. The system according to any of examples 1d-4d, wherein: the rod has a middle third between proximal and distal thirds; the middle third has a smaller maximum outer diameter than the proximal and distal thirds; the strain gauge is located on the middle third of the rod.

Example 6d. The system according to any of examples 1d-5d, wherein the rod is hollow and the shaft and the bearing are both included in a hollow interior of the bracket.

Example 1e. An exoskeleton robotic system comprising a shaft (177) coupled to a linkage (179). A bearing (104) couples the shaft to a housing (178). An actuator (101) includes a motor (101). An exoskeleton robotic joint (180) is configured to rotate the shaft and linkage about the bearing. A reaction torque sensor (102) is configured to sense torque transmitted to the reaction torque sensor via the joint in response to the motor rotating the shaft and the linkage. A bracket (103) includes a tube having an exterior wall (192) and a hollow interior (193). The bracket couples the actuator to the housing. The tube includes at least one void and at least one beam collectively configured to provide stiffness in non-torque directions so movement between opposing ends of the tube do not apply loading to the sensor.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a side of a substrate is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. An exoskeleton robotic system comprising:
a shaft coupled to a linkage;
a bearing that couples the shaft to a housing;
an actuator that includes a motor;
an exoskeleton robotic joint configured to rotate the shaft and linkage about the bearing;
a reaction torque sensor configured to sense torque transmitted to the reaction torque sensor via the joint in response to the motor rotating the shaft and the linkage; and
a bracket including: (a) a tube having an exterior wall and a hollow interior, (b) first, second, third, and fourth voids that each extend from the exterior wall to the hollow interior; (c) a first beam between the first and second voids, a second beam between the third and second voids, a third beam between the first and fourth voids, and a fourth beam between the third and fourth voids;
wherein the bracket includes: (a) an additional first void, an additional second void, an additional third void, and an additional fourth void, the additional first, second, third, and fourth voids each extending from the exterior wall to the hollow interior; (c) an additional first beam between the additional first and second voids, an additional second beam between the additional third and second voids, an additional third beam between the additional first and fourth voids, and an additional fourth beam between the additional third and fourth voids;
wherein the bracket couples the actuator to the housing.

2. The system of claim 1, wherein:
the tube has a long axis extending through the hollow interior and from a first end of the bracket to a second end of the bracket;
a first axis intersects the first beam and the first and second voids, a second axis intersects the second beam and the third and second voids, a third axis intersects the third beam and the first and fourth voids, and a fourth axis intersects the fourth beam and the third and fourth voids;
the first, second, third, and fourth axes are all parallel to the long axis.

3. The system of claim 1, wherein:

the tube has a proximal third, a distal third, and a middle third between the proximal and distal thirds;

a minimum outer diameter of the proximal third of the tube is greater than a maximum outer diameter of the middle third of the tube;

a minimum outer diameter of the distal third of the tube is greater than the maximum outer diameter of the middle third of the tube;

at least a portion of the reaction torque sensor is located on the middle third of the tube.

4. The system of claim 3, wherein:

the reaction torque sensor includes a strain gauge located on the exterior wall of the middle third of the tube;

the shaft and the bearing are both included in the hollow interior of the bracket.

5. The system of claim 2, wherein:

the bracket includes a first flange at the first end of the bracket and a second flange at the second end of the bracket;

each of the first, second, third, and fourth axes intersect both the first and second flanges;

the first flange is between the actuator and the second flange.

6. The system of claim 2, wherein a fifth axis is parallel to the long axis and intersects the second void but does not intersect the first void and does not intersect the third void.

7. The system of claim 2, wherein the first axis intersects the additional first beam and the additional first and second voids, the second axis intersects the additional second beam and the additional third and second voids, the third axis intersects the additional third beam and the additional first and fourth voids, and the fourth axis intersects the additional fourth beam and the additional third and fourth voids.

8. The system of claim 5, wherein:

the bracket couples the actuator to the housing;

the housing couples the bracket to the bearing;

the bracket couples to the actuator via the first flange; and the bracket couples to the housing via the second flange.

9. The system of claim 8, wherein the bracket is a compliant element.

10. The system of claim 8, wherein:

the bracket has first, second, and third translational degrees of freedom;

the bracket has first and second rotational degrees of freedom but not a third rotational degree of freedom.

11. The system of claim 8, wherein the bracket is statically coupled to the reaction torque sensor and is statically coupled to the housing.

12. The robotic system according to any of claim 11, wherein the bracket is not slidingly coupled to the housing.

13. The system of claim 1, wherein the bracket is a compliant mechanism having compliance: (a) translationally along each of X, Y, Z axes, and (b) rotationally about two of the X, Y, Z axes but not a third of the X, Y, Z axes.

14. The system of claim 13, wherein:

the motor is configured to rotate the shaft about the third of the X, Y, Z axes; and the reaction torque sensor is configured to sense torque transmitted about a sensing axis;

the sensing axis is parallel to the third of the X, Y, Z axes.

15. The system of claim 14, wherein the sensing axis is colinear with the third of the X, Y, Z axes.

16. The system of claim 14, wherein:

the first beam is configured to be in tension when the second beam is in compression in response to a first force on the first beam; and the first beam is configured to be in compression when the second beam is in tension in response to a second force on the first beam;

the first and second forces are directed along one of the X, Y, Z axes;

the first and second forces are opposite in direction to one another.

17. The system of claim 14, wherein the reaction torque sensor includes a Wheatstone bridge.

18. The system of claim 1, wherein the bracket has a dumbbell shape.

19. The system of claim 18, wherein:

the tube has a long axis extending through the hollow interior and from a first end of the bracket to a second end of the bracket;

the first, second, third, and fourth beams are coplanar with each other in a plane that is orthogonal to the long axis.

20. The system of claim 1, wherein:

the tube has a long axis extending through the hollow interior and from a first end of the bracket to a second end of the bracket;

a plane, which is orthogonal to the long axis, intersects the shaft, the bearing, and the bracket.

21. A robotic system comprising:

a shaft coupled to a robotic appendage;

a bearing that couples the shaft to a housing;

an actuator that includes a motor;

a robotic joint to rotate the shaft and a linkage via the bearing;

a torque sensor to sense torque created when the motor rotates the appendage; and a bracket including: (a) a rod having an exterior wall, (b) first and second voids in the exterior wall; (c) a beam between the first and second voids, and (d) first and second ends;

wherein the bracket is a compliant element and couples: (a) to the actuator via the first end, (b) to the housing via the second end, (c) the actuator to the housing;

wherein: (a) the bracket has a proximal third, a distal third, and a middle third between the proximal and distal thirds; (b) a maximum outer diameter of the proximal third of the bracket is greater than a minimum outer diameter of the middle third of the bracket; (c) a maximum outer diameter of the distal third of the bracket is greater than the minimum outer diameter of the middle third of the bracket;

wherein at least a portion of the torque sensor is located on the middle third of the bracket.

22. The system of claim 21, wherein the torque sensor includes a strain gauge on the bracket between the first and second ends.

23. The system of claim 22, wherein the bracket has compliance: (a) translationally along each of X, Y, Z axes, and (b) rotationally about two of the X, Y, Z axes but not a third of the X, Y, Z axes.

24. The system of claim 23, wherein:

the motor is configured to rotate the shaft about the third of the X, Y, Z axes;

the torque sensor is to sense torque transmitted about a sensing axis; and the sensing axis is colinear with the third of the X, Y, Z axes.

25. The system of claim 24, wherein the rod is hollow and the shaft and the bearing are both included in a hollow interior of the bracket.

\* \* \* \* \*